(12) United States Patent
Chen (10) Patent No.: US 11,922,707 B2
(45) Date of Patent: Mar. 5, 2024

(54) METHOD AND APPARATUS FOR TRAINING FACE DETECTION MODEL, AND APPARATUS FOR DETECTING FACE KEY POINT

(71) Applicant: BIGO TECHNOLOGY PTE. LTD., Singapore (SG)

(72) Inventor: Dejian Chen, Guangzhou (CN)

(73) Assignee: BIGO TECHNOLOGY PTE. LTD., Singapore (SG)

( * ) Notice: Subject to any disclaimer, the term of this patent is extended or adjusted under 35 U.S.C. 154(b) by 479 days.

(21) Appl. No.: 17/294,664

(22) PCT Filed: Nov. 13, 2019

(86) PCT No.: PCT/CN2019/117945
§ 371 (c)(1),
(2) Date: May 17, 2021

(87) PCT Pub. No.: WO2020/098686
PCT Pub. Date: May 22, 2020

(65) Prior Publication Data
US 2021/0406516 A1    Dec. 30, 2021

(30) Foreign Application Priority Data

Nov. 16, 2018 (CN) .......................... 201811367129.0

(51) Int. Cl.
*G06V 20/64* (2022.01)
*G06F 18/2135* (2023.01)
(Continued)

(52) U.S. Cl.
CPC .......... *G06V 20/64* (2022.01); *G06F 18/2135* (2023.01); *G06F 18/214* (2023.01);
(Continued)

(58) Field of Classification Search
CPC ...... G06V 10/82; G06V 10/454; G06V 20/64; G06V 20/647; G06T 19/20
See application file for complete search history.

(56) References Cited

U.S. PATENT DOCUMENTS

| 2002/0106114 A1 | 8/2002 | Yan et al. |
| 2017/0046563 A1 | 2/2017 | Kim et al. |
| 2018/0268202 A1 | 9/2018 | Yu |

FOREIGN PATENT DOCUMENTS

| CN | 106485230 A | 3/2017 |
| CN | 107680158 A | 2/2018 |

(Continued)

OTHER PUBLICATIONS

First Office Action in Russian Patent Application No. 2021115692 dated Nov. 12, 2021, which is a foreign counterpart application corresponding to this U.S. Patent Application.
(Continued)

*Primary Examiner* — Ross Varndell
(74) *Attorney, Agent, or Firm* — Kolitch Romano Dascenzo Gates LLC (57) ABSTRACT

A method for training a face detection model, including: acquiring a training face image; performing three-dimensional reconstruction on the training face image based on a preset three-dimensional face model, and acquiring a training three-dimensional face model; generating a training UV coordinate map including three-dimensional coordinates of the training three-dimensional face model based on the training three-dimensional face model; and training a semantic segmentation network by using the training face image and the training UV coordinate map, and acquiring a face detection model. The face detection model is configured to generate a UV coordinate map including three-dimensional coordinates.

19 Claims, 6 Drawing Sheets

(51) Int. Cl.
   G06F 18/214 (2023.01)
   G06V 10/44 (2022.01)
   G06V 10/764 (2022.01)
   G06V 10/77 (2022.01)
   G06V 10/774 (2022.01)
   G06V 10/82 (2022.01)
   G06V 40/16 (2022.01)
(52) U.S. Cl.
   CPC .......... *G06V 10/454* (2022.01); *G06V 10/764* (2022.01); *G06V 10/7715* (2022.01); *G06V 10/774* (2022.01); *G06V 10/82* (2022.01); *G06V 40/161* (2022.01)

(56) References Cited

FOREIGN PATENT DOCUMENTS

| | | | | |
|---|---|---|---|---|
| CN | 107766851 A | 3/2018 | | |
| CN | 108304765 A | 7/2018 | | |
| CN | 108805977 A | * 11/2018 | .......... | G06N 3/0454 |
| CN | 108805977 A | 11/2018 | | |
| CN | 108921926 A | 11/2018 | | |
| CN | 109508678 A | 3/2019 | | |
| RU | 2610682 C1 | 2/2017 | | |
| WO | 2017049677 A1 | 3/2017 | | |
| WO | 2018085749 A1 | 5/2018 | | |
| WO | WO-2020042975 A1 | * 3/2020 | .......... | G06K 9/00208 |

OTHER PUBLICATIONS

The Hague, Supplemental European Search Report pursuant to Art. 153(7) EPC, dated Dec. 16, 2021 in EP Patent Application No. 19883820.3, which is a foreign counterpart.
Communication pursuant to Article 94(3) EPC of counterpart EP Application No. 19883820.3 dated Jan. 11, 2022.
Elad Richardson, et al.; "3D Face Reconstruction by Learning from Synthetic Data"; arxiv.org, Cornell University Library, 201 Olin Library Cornell University Ithaca, NY 14853, XP080726710, DOI: 10.1109/3DV.2016.56; Sep. 14, 2016, sections 5.1, 5.2, 4, 8 and 9.
Soumyadip Sengupta, et al.; "SfSNet: Learning Shape, Reflectance and Illuminance of Faces 'in the Wild'"; 2018 IEEE/CVF Conference On Computer Vision and Pattern Recognition, IEEE, XP033473546, DOI: 10.1109/CVPR.2018.00659; Jun. 18, 2018, pp. 6296-6305, section 3.
Search Report of the Intellectual Property Office of Singapore for Application No. 11202105115T dated Mar. 21, 2023.
Feng, Yao et al., "Joint 3D Face Reconstruction and Dense Alignment with Position Map Regression Network", Proceedings of 15th European Conference on Computer Vision (ECCV), pp. 557-574, Figs. 2, 3 and 6, Section 2.2, 3.1, 3.2, 3.3 and 4.1; Sep. 8, 2018.
International Search Report of the International Searching Authority for China National Intellectual Property Administration in PCT application No. PCT/CN2019/117945 dated Feb. 12, 2020, which is an international application corresponding to this U.S. application.
The State Intellectual Property Office of People's Republic of China, First Office Action in Patent Application No. 201811367129.0 dated Sep. 2, 2020, which is a foreign counterpart application corresponding to this U.S. Patent Application, to which this application claims priority.
The State Intellectual Property Office of People's Republic of China, Second Office Action in Patent Application No. 201811367129.0 dated Dec. 18, 2020, which is a foreign counterpart application corresponding to this U.S. Patent Application, to which this application claims priority.
Notification to Grant Patent Right for Invention of Chinese Application No. 201811367129.0 dated Mar. 3, 2021.

* cited by examiner

METHOD AND APPARATUS FOR TRAINING FACE DETECTION MODEL, AND APPARATUS FOR DETECTING FACE KEY POINT

CROSS-REFERENCE TO RELATED APPLICATION

This application is a US national stage of international application No. PCT/CN2019/117945, filed on Nov. 13, 2019, which claims priority to the Chinese Patent Application No. 201811367129.0, filed on Nov. 16, 2018. Both applications are incorporated herein by reference in their entireties.

TECHNICAL FIELD

Embodiments of the present disclosure relates to the field of data processing technologies, such as a method for training a face detection model, a method for detecting a face key point, an apparatus for training a face detection model, an apparatus for detecting a face key point, a device and storage medium.

BACKGROUND

With the development of Internet technologies, various video applications have appeared, and people can communicate more intuitively through these video applications.

In the process of video live streaming or short video recording, users usually need to perform special effect processing on videos, such as adding beauty to the face, posting stickers on the face and other special effects in the video. The addition of the above special effects depends on key points of eyes, mouth, nose, etc. on the face. Therefore, the accuracy of detecting the face key points is especially important for the special effect processing. In the related methods for detecting a face key point, one method is direct regression. Coordinates of each key point are returned by inputting a face image into Convolutional Neural Network (CNN). Another method is a hierarchical method, which improves the accuracy by predicting the coordinates of key points for a plurality of times. Using coordinates of a previously predicted key point as the center, a plurality of partial pictures are cropped, and then the plurality of partial pictures are input into the CNN to return to final key point coordinates.

However, when training the CNN, if an angle of the face in the face image is large in a training sample, some parts of the face are sheltered, and the sheltered part needs to be manually estimated and labeled, resulting in inaccurate training data and causing a problem of inaccurate coordinates of the key points output by the CNN.

SUMMARY

Embodiments of the present disclosure provides a method for training a face detection model, a method for detecting a face key point, an apparatus for training a face detection model, an apparatus for detecting a face key point, a device and storage medium to avoid a case that the related methods for detecting a face key point inaccurately detect a face key point and to improve the accuracy of detecting a face key point.

According to a first aspect, an embodiment of the present disclosure provides a method for training a face detection model. The method includes: acquiring a training face. image; performing three-dimensional reconstruction on the training face image based on a preset three-dimensional face model, and acquiring a training three-dimensional face model; generating a training UV coordinate map including three-dimensional coordinates of the training three-dimensional face model based on the training three-dimensional face model and training a semantic segmentation network by using the training face image and the training UV coordinate map, and acquiring a face detection model, wherein the face detection model is configured to generate a UV coordinate map including three-dimensional coordinates.

According to a second aspect, an embodiment of the present disclosure provides a method for detecting a face key point. The method includes: acquiring a target face image; inputting the target face image into a pre-trained face detection model to generate a UV coordinate map of the target face image, wherein the UV coordinate map includes a plurality of pixel points, and each pixel point of the UV coordinate map includes three-dimensional coordinates; acquiring a UV template image including a pre-labeled face key point; and determining a pixel point corresponding to the face key point in the UV coordinate map to detect three-dimensional coordinates of the face key point.

According to a third aspect, an embodiment of the present disclosure provides an apparatus for training a face detection model. The apparatus includes: a training face image acquiring module configured to acquire a training face image; a three-dimensional reconstruction module configured to perform three-dimensional reconstruction on the training face image based on a preset three-dimensional face model and acquire a training three-dimensional face model; a training UV coordinate map generating module configured to generate a training UV coordinate map including three-dimensional coordinates of the training three-dimensional face model based on the training three-dimensional face model; and a training module configured to train a semantic segmentation network by using the training face image and the training UV coordinate map and acquire a face detection model, wherein the face detection model is configured to generate a UV coordinate map including three-dimensional coordinates.

According to a fourth aspect, an embodiment of the present disclosure provides an apparatus for detecting a face key point. The apparatus includes: a target face image acquiring module configured to acquire a target face image; a UV coordinate map generating module configured to input the target face image into a pre-trained face detection model to generate a UV coordinate map of the target face image, wherein the UV coordinate map includes a plurality of pixel points, and each pixel point of the UV coordinate map includes three-dimensional coordinates; a template image acquiring module configured to acquire a UV template image including a pre-labeled face key point; and a face key point three-dimensional coordinates detecting module configured to determine a pixel point corresponding to the face key point in the UV coordinate map to detect three-dimensional coordinates of the face key point.

According to a fifth aspect, an embodiment of the present disclosure provides a device. The device includes: at least one processor; and a storage apparatus for storing at least one program, wherein when the at least one program is executed by the at least one processor, the at least one processor is enabled to realize at least one of the method for training a face detection model and the method for detecting a face key point according to any of the embodiments of the present disclosure.

According to a sixth aspect, an embodiment of the present disclosure provides a computer-readable storage medium. The computer-readable storage medium stores a computer program therein, wherein when the program is executed by a processor, at least one of the method for training a face detection model and the method for detecting a face key point according to any of the embodiments of the present disclosure is realized.

DETAILED DESCRIPTION

Figure 1:
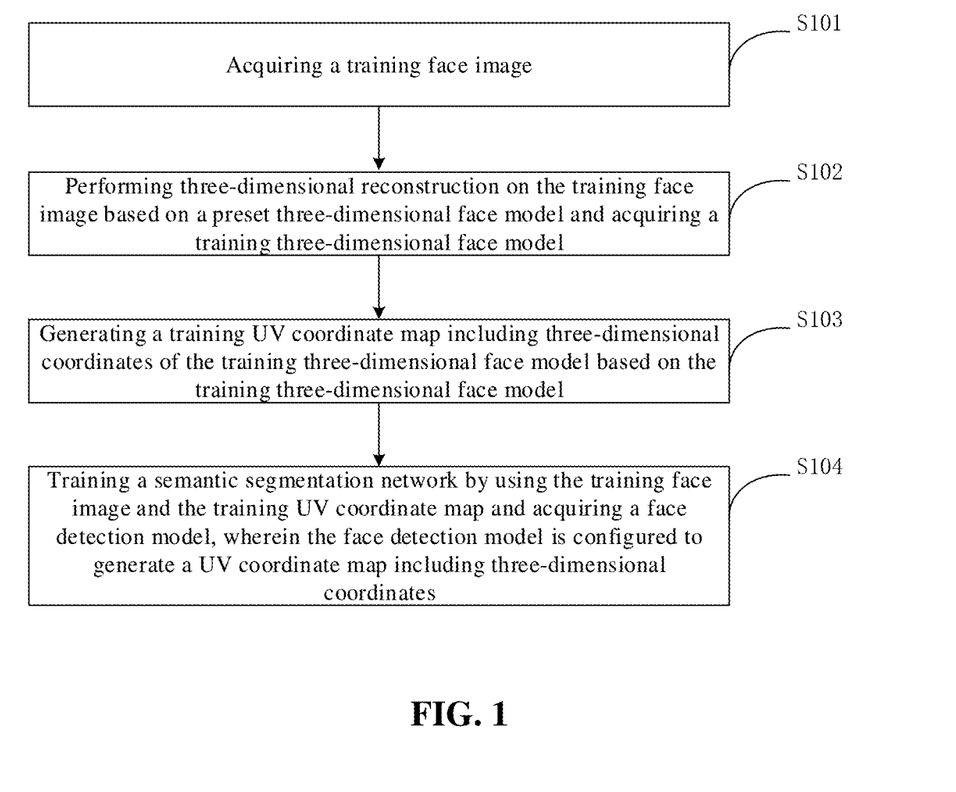
FIG. 1 is a flow chart of a method for training a face detection model according an embodiment of the present disclosure.

FIG. 1 is a flow chart of a method for training a face detection model according to an embodiment of the present disclosure. The embodiment of the present disclosure may be applied to a situation of training a face detection model to generate a UV coordinate map including three-dimensional coordinates. The method may be performed by an apparatus for training a face detection model. The apparatus may be implemented by at least one of software and hardware and integrated in a device that performs the method.

As shown in FIG. 1, the method may include step S101 to step S104.

In step S101, a training face image is acquired.

The training face image may be a two-dimensional image containing a face. The storage format of the two-dimensional image may be BMP, JPG, PNG, TIF, and other formats. BMP (Bitmap) is a standard image file format in the Windows operating system. BMP uses a bit-mapped storage format. An image depth of BMP files includes 1 bit, 4 bit, 8 bit and 24 bit. JPG is the Joint Photographic Experts Group (JPEG) format. JPEG images store a single bitmap in 24-bit color. JPEG is a platform-independent format. Portable Network Graphic Format (PNG) is a bitmap file storage format. When PNG is used to store the images, a depth of grayscale images may be as much as 16 bits, a depth of color images may be as much as 48 bits, and up to 16 bits of alpha channel data may be stored. Tag image file format (TIF) is a flexible bitmap format and mainly used to store images including photos and artistic drawings.

In practical applications, the training face image may be selected from locally stored images, or a public/published face image may be acquired from the network as the training face image, or a face image may be captured from videos as the training face image. Neither the storage format of the training face image nor the method of acquiring the training face image is limited in the embodiment of the present disclosure.

In step S102, a training three-dimensional face model is acquired by performing three-dimensional reconstruction on the training face image based on a preset three-dimensional face model.

The preset three-dimensional face model may be to acquire three-dimensional scan data of a real face by performing three-dimensional scanning on the real face. The three-dimensional scanning data is the three-dimensional face model. By performing three-dimensional scanning on a plurality of real faces, a plurality of different three-dimensional face models may be acquired to generate a three-dimensional face model library. Of course, the three-dimensional face model may also be a public three-dimensional face model.

In the embodiment of the present disclosure, a large number of preset three-dimensional face models may be analyzed to acquire a principal component and an eigenvalue of the three-dimensional face model. Different three-dimensional face models may be generated by the principal components and by fitting different eigenvalues. Therefore, for the training face image, different eigenvalues may be fitted to perform the three-dimensional reconstruction to generate the training three-dimensional face model corresponding to the training face image. By acquiring a plurality of training face images to generate a corresponding three-dimensional face model, it is possible to avoid situations where the cost of performing three-dimensional scanning on real faces to acquire the three-dimensional face model is high, the data of the public three-dimensional face model is sparse and sufficient training data for the training of the face detection model cannot be provided. Therefore, the efficiency of acquiring training data is improved and the cost of acquiring training data is reduced.

In step S103, a training UV coordinate map including three-dimensional coordinates of the training three-dimensional face model is generated based on the training three-dimensional face model.

UV is an abbreviation of U, V texture mapping coordinates, where U is a horizontal coordinate and V is a vertical coordinate. Through a two-dimensional UV coordinate map, each point on an image in the UV coordinate system may be mapped to a surface of the three-dimensional face model. That is, each point on the three-dimensional face model has a unique point on the UV coordinate map, and the three-dimensional face model may be restored through the UV coordinate map. In an embodiment of the present disclosure, the UV coordinate map may be a two-dimensional plan that stores the three-dimensional coordinates of the training three-dimensional face model. The UV coordinate map may consist of a three-dimensional array. For example, for a 226×226×3 array, the first two dimensions of data are the position of a pixel point of the UV coordinate map on the UV coordinate map, and the last dimension of data represents three-dimensional coordinates associated with the pixel point. The three-dimensional coordinates are the three-dimensional coordinates of the point on the training three-dimensional face model.

In an embodiment, the training three-dimensional face model may be a set of a plurality of vertices. Each vertex has defined three-dimensional coordinates. A corresponding training UV coordinate map may be generated based on the vertices of the three-dimensional face model. Pixel points on the training UV coordinate map correspond to the vertices on the training three-dimensional face model one by one. Each pixel point is associated with three-dimensional coordinates of its corresponding vertex.

In step S104, a face detection model is acquired by training a semantic segmentation network using the training face image and the training UV coordinate map, wherein the face detection model is configured to generate a UV coordinate map including three-dimensional coordinates.

In an embodiment, the face detection model may generate the UV coordinate map including three-dimensional coordinates based on an input face image. When the face detection model is trained, the training face image may be used as training data. The training UV coordinate map corresponding to the training face image is used as a training label. The training face image is input into the semantic segmentation network. Three-dimensional coordinates of each pixel point of the training face image and the position of each pixel point in the UV coordinate map are estimated to generate a predicted UV coordinate map. Then, a loss rate is calculated based on the predicted UV coordinate map and the training UV coordinate map corresponding to the input training face image, and network parameters are adjusted to acquire the final trained face detection model. After a new face image is input into the face detection model, a UV coordinate map corresponding to the face image may be acquired by the trained face detection model. Each pixel point on the UV coordinate map corresponds to the pixel point on the face image and includes three-dimensional coordinates.

In the embodiment of the present disclosure, after a training face image is acquired, a training three-dimensional face model is acquired by performing three-dimensional reconstruction on the training face image based on a preset three-dimensional face model, and a training UV coordinate map including three-dimensional coordinates of the training three-dimensional face model is generated based on the training three-dimensional face model; and a face detection model is acquired by training a semantic segmentation network using the training face image and the training UV coordinate map. In the embodiment of the present disclosure, the three-dimensional reconstruction is performed on the training face image, and the training UV coordinate map is generated by the training three-dimensional face model generated after three-dimensional reconstruction, so as to acquire training data to train a semantic segmentation network, and acquire a face detection model without manual labeling of the training face image and the training UV coordinate map, thereby avoiding the situations where manual estimation and labeling need to be performed on the training data in the related art, which results in inaccurate training data and inaccurate face key point coordinates output by the CNN. The embodiment of the present disclosure improves the performance of the face detection model, and also improves the accuracy of face key point detection.

The face detection model may generate the UV coordinate map including three-dimensional coordinates, and may detect the three-dimensional coordinates of key points, such that the detected face key points can have depth information and the application scenarios of key points can be enriched.

Figure 2:
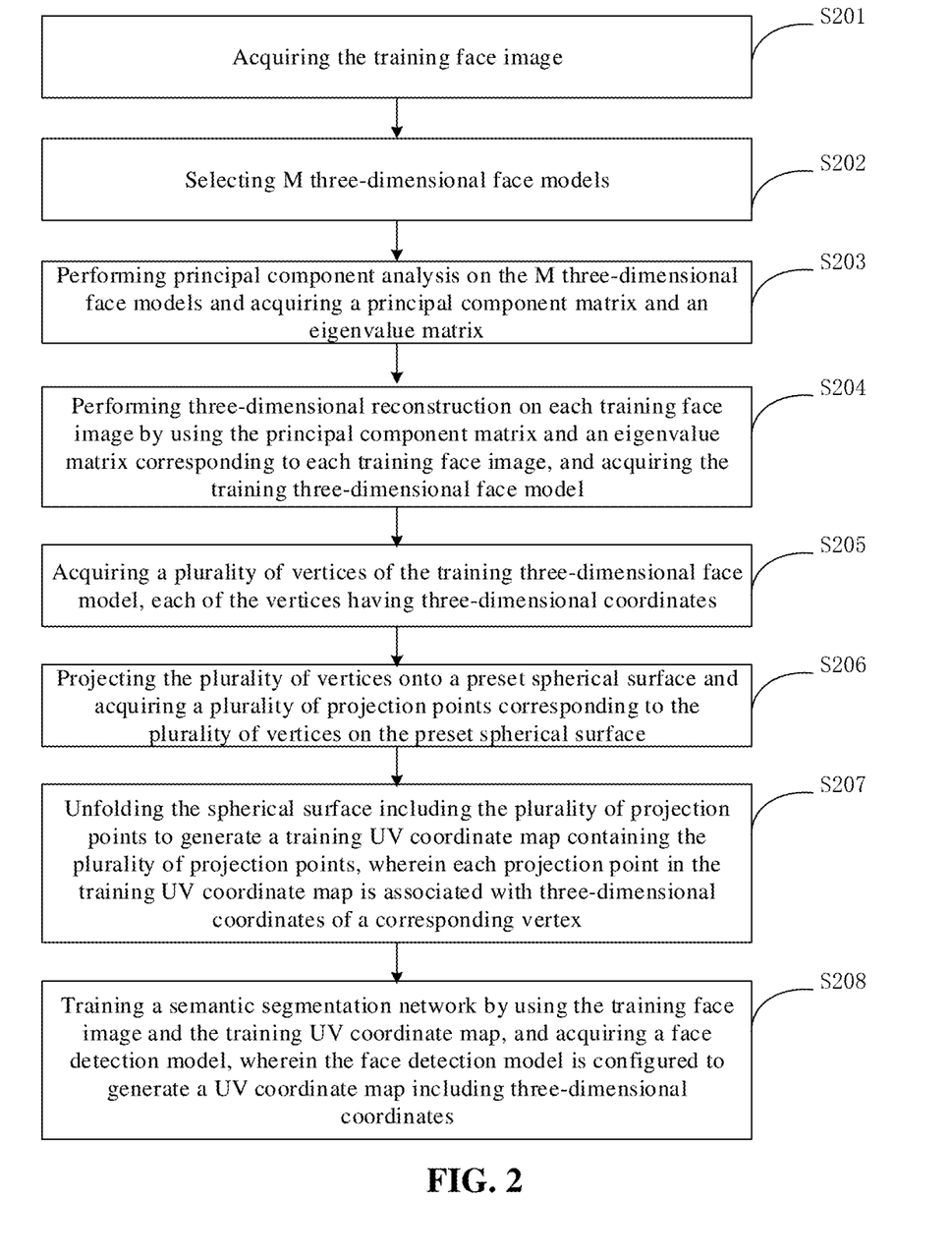
FIG. 2 is a flow chart of another method for training a face detection model according to an embodiment of the present disclosure.

FIG. 2 is a flow chart of another method for training a face detection model according to an embodiment of the present disclosure. On the basis of the above embodiment, the embodiment of the present disclosure refines the three-dimensional reconstruction and the generation of the training UV coordinate map. As shown in FIG. 2, the method may include step S201 to step S208.

In step S201, a training face image is acquired.

In step S202, M three-dimensional face models are selected.

In the embodiment of the present disclosure, M is the number of three-dimensional face models, and the M three-dimensional face models may be selected from a preset three-dimensional face model library. The selected three-dimensional face models are preprocessed. The preprocessed three-dimensional face models are aligned by using an optical flow method to acquire aligned three-dimensional face models.

The three-dimensional face model may be generated by three-dimensional scanning. Different scanners have different imaging principles. Some areas of the three-dimensional face model may have missing data. Holes filling processing may be made to the three-dimensional face model having missing data. Alternatively, in order to eliminate or reduce the unsmoothness of the surface of the three-dimensional face model caused by slight changes in lighting conditions during the scanning process, smoothing processing may be made to the three-dimensional face model. Of course, correction processing may also be made to the three-dimensional coordinates of vertices of local areas. The way of preprocessing is not limited in the embodiment of the present disclosure.

In addition, in order to avoid inconsistencies in the number of vertices, the number of patches, and the data structures of the three-dimensional face models after preprocessing, which are resulted from the differences between different three-dimensional face models, the three-dimensional face models may be aligned by using the optical flow method, such that the three-dimensional face models have vectors with the same dimensions, and vertices with the same semantic information correspond to the same vector position.

In an embodiment, it is assumed that a vertex on the three-dimensional face model is represented by cylindrical coordinates as I (h, Ø), where h represents the height of the vertex in the cylindrical coordinates, and Ø represents the angle of rotation. According to the definition of the optical flow method, when the vertex moves slightly, its brightness remains unchanged. From this, a mathematical expression of h and Ø may be obtained:

$$E = \sum_{h,\emptyset \subset n} \left\| v_k \frac{\partial I(h,\emptyset)}{\partial h} + v_o \frac{\partial I(h,\emptyset)}{\partial \emptyset} + \Delta I \right\|^2$$

where $v_h$ and $v_\emptyset$ represent optical flow, which may be approximately replaced by $\Delta h$ and $\Delta \emptyset$, R represents a 5×5 adjacent area centered on (h, Ø), and $\|.\|^2$ represents the L2 norm. For each vertex (h, Ø), the above function E should be as small as possible.

Partial derivatives $$\frac{\partial I(h,\varnothing)}{\partial h} \text{ and } \frac{\partial I(h,\varnothing)}{\partial \varnothing}$$

and solved by the above function are denoted with Ih and I∅, then the new position (h',∅') of each vertex (h, ∅) is as follows:

$$h'=h+\Delta h \times Ih, \varnothing'=\varnothing+\Delta\varnothing \times I\varnothing.$$

Figure 3:
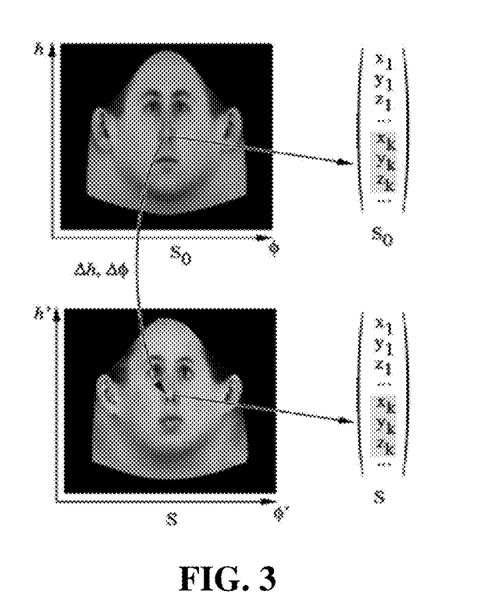
FIG. 3 is a schematic diagram of aligning a three-dimensional face model according to an embodiment of the present disclosure.

As shown in FIG. 3, assuming that a template face is $S_0=(x_1y_1z_1, x_2y_2z_2, \ldots, x_ky_kz_k)$, and is $S=(x_1y_1z_1, x_2y_2z_2, \ldots, x_ky_kz_k)$ after a new face is aligned to the template face. That is, all three-dimensional faces have k-dimensional vectors, and vertices with the same semantic information correspond to the same vector positions. For example, points on the nose in $S_0$ and S are stored in the $k^{th}$ vector position, such that the three-dimensional face models are aligned.

In step S203, a principal component matrix and an eigenvalue matrix are acquired by performing a principal component analysis on the M three-dimensional face models.

A principal component analysis (PCA) is a multivariate statistical analysis method in which a plurality of variables are linearly transformed to select a small number of important variables. In an embodiment of the present disclosure, the principal component matrix and the eigenvalue matrix of the M three-dimensional face models may be acquired by performing the principal component analysis on the M three-dimensional face models.

In an exemplary embodiment, for each of the three-dimensional face models $S_1, S_2, \ldots, S_m$, a mean value is calculated by the following formula:

$$\bar{s} = \frac{1}{m}\sum_{i=1}^{m} S_i$$

where $\bar{S}$ is an average value of the three-dimensional face models, that is, an average face model, m is the number of the selected three-dimensional face models, and $S_i$ is the three-dimensional face model.

Then, a deviation $\alpha_i=S_i-\bar{s}$ of each three-dimensional face model $S_i$ is solved, and a matrix $A=(\alpha_1)$ composed of the deviations may be obtained. Then a covariance matrix of A is as follows:

$$C = \frac{1}{m}AA^T \sum_{i=1}^{m} a_i a_i^T$$

After performing eigenvalue decomposition on the covariance matrix, the first m principal component matrices $s=(s_1, s_2, \ldots s_m)$ and eigenvalue matrices $\alpha=(\alpha_1, \alpha_2, \ldots, \alpha_m)$ may be obtained by ranking the eigenvalues from large to small. Then any three-dimensional face model $S_i$ may be approximately expressed linearly by the principal component matrix s and the eigenvalue matrix α.

In step S204, for each training face image, a training three-dimensional face model is acquired by performing three-dimensional reconstruction using the principal component matrix and an eigenvalue matrix corresponding to each training face image.

In an embodiment, an initial eigenvalue matrix and an initial projection parameter matrix may be set, and an initial three-dimensional face model may be constructed using the initial eigenvalue matrix and the principal component matrix.

For example, set the initial eigenvalue matrix $\alpha'=(\alpha_1', \alpha_2', \ldots \alpha_n')$, and the initial three-dimensional face model $S'=\alpha's=\alpha_1's_1+\alpha_2's_2+\ldots+\alpha_n's_n$ is constructed based on the initial eigenvalue matrix $\alpha'$ and the principal component matrix s.

After the initial three-dimensional face model is constructed, a projected face image of the initial three-dimensional face model in a two-dimensional space may be acquired based on the initial projection parameter matrix.

In an embodiment, issues such as face translation, face rotation, illumination and the like need to be taken into consideration in the projection of the initial three-dimensional face model to the two-dimensional space. Set the translation coordinates as $(t_x, t_y, t_z)$, the face rotation parameter as $(\varphi, \theta, \gamma)$, the ambient light intensity as $(r_{amb}, g_{amb}, b_{amb})$, the directed light intensity as $(r_{dir}, g_{dir}, b_{ambdir})$, and the light source direction as $(\varnothing_{dir}, \theta_{dir})$. The above projection parameters are represented by the matrix ρ.

Set the initial projection parameter matrix ρ, the initial three-dimensional face model S' is projected onto the two-dimensional plane to acquire the projected face image $I_{model}=\rho S'$ of the initial three-dimensional face model. Set the training face image as $I_{input}$, then the smaller the difference between the projected face image $I_{model}$ and the training face image $I_{input}$ is, the closer the initial three-dimensional face model is to the real face corresponding to the training face image.

Therefore, a difference value between the projected face image and the training face image may be calculated. The initial eigenvalue matrix and the initial projection parameter matrix may be iteratively optimized by using a stochastic gradient descent method based on the difference value. When the difference value converges, the eigenvalue matrix and the projection parameter matrix may be acquired and taken as a target eigenvalue matrix and a target projection parameter matrix. The target eigenvalue matrix may be taken as the eigenvalue matrix corresponding to the training face image.

In an embodiment, the difference value between the projected face image $I_{model}$ and the training face image $I_{input}$ may be calculated by the following formula:

$$E_I = \sum_{x,y} \|I_{input}(x,y) - I_{model}(x,y)\|^2$$

where $E_I$ is the difference value, $I_{input}(x, y)$ is a pixel point on the training face image, $I_{model}(x,y)$ is a pixel point on the training face image, and $\|.\|^2$ represents the L2 norm.

If $E_I$ is greater than a preset threshold, it is necessary to optimize the initial eigenvalue matrix $\alpha'$ and the initial projection parameter matrix ρ, reconstruct the three-dimensional face model based on the optimized initial eigenvalue matrix $\alpha'$ and initial projection parameter matrix ρ for projection, and calculate the difference value $E_I$ until the difference value $E_I$ converges.

In an embodiment, a stochastic gradient descent algorithm (SGD) may be used for optimization. For example, for first N rounds of iterative optimization, K feature points are randomly selected from the training face image and the projected face image. The difference value between the projected face image and the training face image may be calculated based on the K feature points. Some eigenvalues in the initial eigenvalue matrix and the initial projection parameter matrix may be iteratively optimized using the stochastic gradient descent method based on the difference value. After the N rounds of iterative optimization, all the eigenvalues in the eigenvalue matrix after the N rounds of iterations and the projection parameter matrix after the N rounds of iterations may be optimized by using the stochastic gradient descent method. When the difference value converges, the eigenvalue matrix and the projection parameter matrix are acquired and taken as the target eigenvalue matrix and target projection parameter matrix.

For example, in each iteration of the first N rounds, K=40 random feature points are selected from the training face image $I_{input}$ and the projected face image $I_{model}$ for optimization. The feature points are key pixel points that describe the contours of the facial features. The feature points may be pixel points on the eyes, mouth or face contour of the face. By selecting a smaller number of feature points to calculate the difference value to optimize the initial eigenvalue matrix $\alpha'$ and the initial projection parameter matrix $\rho$, it is possible to avoid calculation redundancy caused by each iteration optimization and improve the optimization speed.

At the same time, it is possible to first optimize n large eigenvalues in the initial eigenvalue matrix $\alpha'$ to avoid overfitting caused by fitting small eigenvalues in the first N rounds of iterations. Therefore, in the first N rounds of iterations, more important eigenvalues may be fitted. For example, in the first 100 rounds of iterations, 10 large eigenvalues and the projection parameter matrix $\rho$ are optimized. After the 100 rounds of iterations, all the eigenvalues and the projection parameter matrix $\rho$ are optimized. When the difference value $E_I$ converges, the target eigenvalue matrix is acquired. The training three-dimensional face model may be generated by the target eigenvalue matrix and the principal component matrix.

Figure 4:
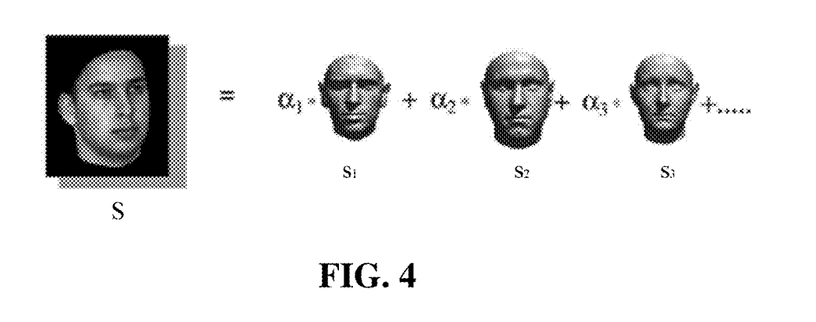
FIG. 4 is a schematic diagram of generating a three-dimensional face model by performing three-dimensional reconstruction according to an embodiment of the present disclosure.

As shown in FIG. 4, the training three-dimensional face model S is generated by fitting the principal components in the principal component matrix and the eigenvalues in the target eigenvalue matrix. That is, the training three-dimensional face model may be acquired by performing three-dimensional reconstruction on the training face image based on the preset three-dimensional face model. It is possible to avoid the situations where the cost of performing three-dimensional scanning on faces to acquire the three-dimensional face model is high and the data of the public three-dimensional face model is sparse and sufficient training data for the training of the face detection model cannot be provide. The embodiments of the present disclosure can improve the efficiency of acquiring training data and reduce the cost of acquiring training data.

In step S205, a plurality of vertices of the training three-dimensional face model are acquired, each of the vertices having three-dimensional coordinates.

In the embodiment of the present disclosure, the training three-dimensional face model may be a collection of a plurality of vertices, and each vertex has defined three-dimensional coordinates in the training three-dimensional face model. For example, the training three-dimensional face model is $S=(x_1y_1z_1x_2z_2, \ldots, x_ky_kz_k)$. That is, the training three-dimensional face model includes k vertices.

In step S206, a plurality of vertices are projected onto a preset spherical surface and a plurality of projection points, which are on a preset spherical surface and correspond to the plurality of vertices, are acquired.

In an embodiment, the plurality of vertices may be projected onto a spherical surface with a preset radius through spherical projection. For example, for each vertex of the three-dimensional face model, the vertex is connected to a center of the sphere, and an intersection point of the connection on the spherical surface is the projection of the vertex on the sphere. After the plurality of vertices of the training three-dimensional face model are projected, an irregular training three-dimensional face model may be projected onto the sphere.

In step S207, an unfolding processing is performed on the sphere containing the plurality of projection points so as to generate a training UV coordinate map containing the plurality of projection points, wherein each projection point in the training UV coordinate map is associated with three-dimensional coordinates of a corresponding vertex.

In an embodiment, the UV coordinate map may be acquired by unfolding the preset spherical surface into a two-dimensional plan view. The UV coordinate map stores the three-dimensional coordinates of the plurality of vertices of the training three-dimensional face model. That is, each pixel point in the UV coordinate map corresponds to only one vertex on the training three-dimensional face mode. The training three-dimensional face model may be restored through the pixel points in the UV coordinate map. The pixel points in the UV coordinate map are the projection points, and the pixel points and the projection points are in a one-to-one correspondence.

In step S208, a face detection model is acquired by training a semantic segmentation network using the training face image and the training UV coordinate map, wherein the face detection model is configured to generate a UV coordinate map including three-dimensional coordinates.

In the embodiment of the present disclosure, the semantic segmentation network may be trained by taking the training face image as training data and taking the training UV coordinate map corresponding to the training face image as the training label.

In an embodiment, the training face image may be randomly extracted. A predicted UV coordinate map may be extracted by inputting the training face image into a semantic segmentation network. A loss rate of the predicted UV coordinate map may be calculated by using a preset loss function and the training UV coordinate map. A gradient may be calculated using the loss rate. Whether the gradient satisfies a preset iteration condition is judged. The semantic segmentation network may be determined as a face detection model based on a judgment result that the gradient satisfies the preset iteration condition. Gradient descent is performed on a network parameter of the semantic segmentation network using the gradient and a preset learning rate, and the step of extracting the training face image is returned based on the judgment result that the gradient does not satisfy the preset iteration condition.

In practical applications, the semantic segmentation network may be a semantic segmentation network such as FCN, SegNet, U-Net, and the like. In the embodiment of the present disclosure, the semantic segmentation network may be trained by means of random gradient descent.

In an embodiment of the present disclosure, a predicted UV coordinate map may be extracted by inputting the training face image into the semantic segmentation network. In an embodiment, the predicted UV coordinate map has the same resolution as the input training face image, for example, 226×226. Each pixel point on the predicted UV coordinate map is associated with three-dimensional coordinates. Then the training UV coordinate map corresponding to the training face image may be acquired. The loss rate of the predicted UV coordinate map may be calculated through the predicted UV coordinate map, the training UV coordinate map, the preset loss function and a preset loss weight. The preset loss weight is a preset loss weight of a feature point in the training UV coordinate map. The feature point is a key pixel point that describes the outlines of the facial features, such as a pixel point on the eyes, mouth, nose, or the contour of the face.

In an embodiment, the preset loss function is as follows:

$$\text{Loss} = \Sigma \|P(u,v) - \tilde{P}(u,v)\| \cdot W(u,v)$$

where $P(u, v)$ is the training UV coordinate map, $\tilde{P}(u, v)$ is the predicted UV coordinate map, and $W(u,v)$ is the preset loss weight. For the training UV coordinate map $P(u,v)$ and the predicted UV coordinate map $\tilde{P}(u,v)$, the three-dimensional coordinates associated with the pixel points at the same position may be extracted respectively to calculate the difference value, and then the difference value of each pixel point may be obtained. If the pixel point is in a key point area of the face, such as the eyes, mouth, nose, and the like, the preset loss weight may be increased. For example, if the pixel point $(u, v)$ in the key area of the eyes, mouth, nose, and the like, then $W(u,v)$ is set to 4, and if in other areas, $W(u, v)$ is set to 1 to improve accuracy.

After the loss rate the calculated, a partial derivative of each network parameter $w_t$ with respect to the loss function Loss may be calculated to obtain the gradient:

$$\nabla \theta = \frac{\partial \text{Loss}}{\partial w_t}$$

where $\nabla \theta$ is the gradient, Loss is the loss function, $w_t$ is the network parameter, and $\partial$ is to solve the partial derivative.

If the gradient does not meet a preset iteration condition, for example, the difference between successive gradients is greater than or equal to a preset difference threshold, or the number of iterations is not reached, gradient descent is performed on the network parameter of the semantic segmentation network according to the following formula using the gradient and the preset learning rate:

$$w_{t+1} = w_t \times \nabla \theta$$

where $w_{t+1}$ is the network parameter after update, $w_t$ is the network parameter before the update, lr is the learning rate, and $\nabla \theta$ is the gradient.

If the gradient satisfies the preset iteration condition, for example, the difference between successive gradients is less than or equal to the preset difference threshold, or the number of iterations is reached, the training is ended, the network parameter $w_t$ is output, and the face detection model is acquired.

In the embodiment of the present disclosure, three-dimensional reconstruction is performed on the training face image to generate the training three-dimensional face model, and the training UV coordinate map is generated by the training three-dimensional face model, so as to acquire training data to train a semantic segmentation network, and acquire a face detection model without manual labeling of the training face image and the training UV coordinate map, thereby avoiding the situations where manual estimation and labeling need to be performed on the training data in the related art, and thus result in inaccurate training data and inaccurate face key point coordinates output by the CNN. The embodiments of the present disclosure improve the performance of the face detection model, and also improve the accuracy of face key point detection.

The face detection model may generate the UV coordinate map including three-dimensional coordinates, and may detect the three-dimensional coordinates of key points, such that the detected face key points have depth information, and the application scenarios of key points is enriched.

Figure 5:
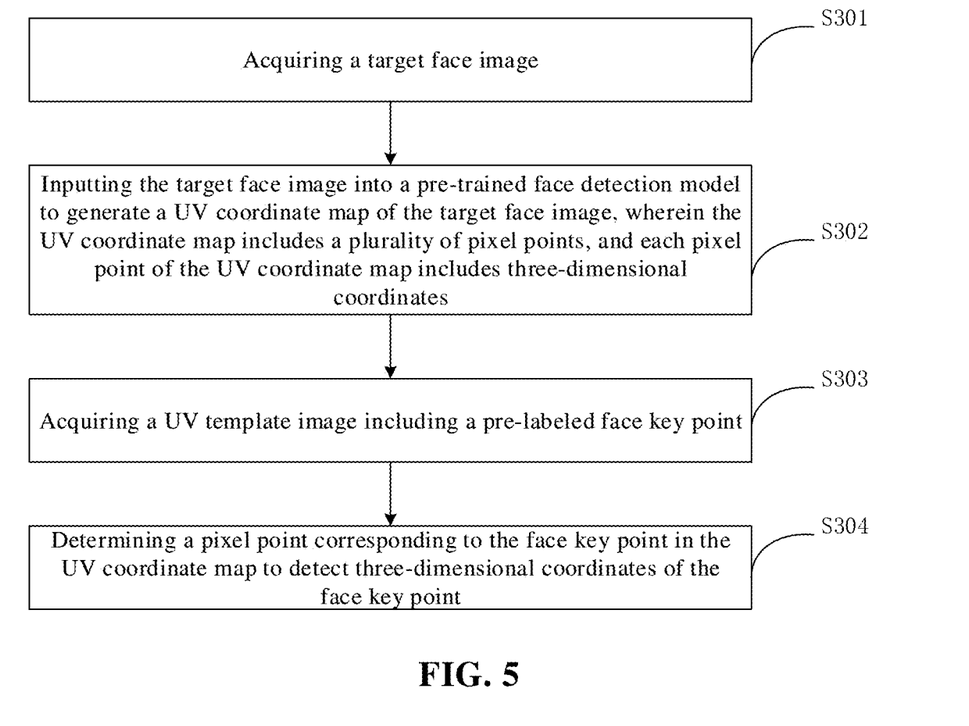
FIG. 5 is a flow chart of a method for detecting a face key point according to an embodiment of the present disclosure.

FIG. 5 is a flow chart of a method for detecting a face key point according to an embodiment of the present disclosure. The embodiment of the present disclosure is applicable to the case of detecting a face key point through a face image. The method may be performed by an apparatus for detecting a face key point. The apparatus may be implemented by at least one of software and hardware and integrated in a device for performing the method. As shown in FIG. 5, the method may include steps S301 to S304.

In step S301, a target face image is acquired.

In the embodiment of the present disclosure, the target face image may be a face image to which a video effect is to be added. For example, in the process of live video or short video recording, when a user selects the operation of adding video effects such as cosmetic contact lenses, adding stickers, face-lifting, and the like, a live video APP detects the user's operation and captures an image frame containing the face from video frames collected by a camera as the target face image. The target face image may also be a face image of a face to be authenticated that is collected by a face authentication device during face authentication, may also be a face image when the user performs image processing on images stored locally, and may also be another image of which face key points are to be detected. The method of acquiring the target face image is not limited in the embodiment of the present disclosure.

In step S302, the target face image is input into a pre-trained face detection model so as to generate a UV coordinate map of the target face image, the UV coordinate map includes a plurality of pixel points, and each pixel point in the UV coordinate map includes three-dimensional coordinates.

In the embodiment of the present disclosure, the face detection model may be trained through step S3021 to step S3024.

In step S3021, a training face image is acquired.

In step S3022, a training three-dimensional face model is acquired by performing three-dimensional reconstruction on the training face image based on a preset three-dimensional face model.

In step S3023, a training UV coordinate map including three-dimensional coordinates of the training three-dimensional face model is generated based on the training three-dimensional face model.

In step S3024, a face detection model is acquired by training a semantic segmentation network using the training face image and the training UV coordinate map, wherein the face detection model is configured to generate a UV coordinate map including three-dimensional coordinates.

For the method for training a face detection model, reference may be made to the above embodiment, which will not be described in detail here.

Figure 6:
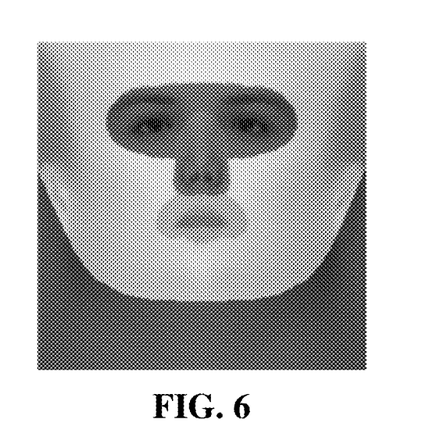
FIG. 6 is a schematic diagram of a UV coordinate map output by a face detection model according to an embodiment of the present disclosure.

As shown in FIG. 6, after the target face image is input into the pre-trained face detection model, the UV coordinate map of the target face image as shown in FIG. 6 may be generated. The UV coordinate map includes a plurality of pixel points. Each pixel point in the UV coordinate map includes three-dimensional coordinates. In an exemplary embodiment, the resolution of the output UV coordinate map is the same as that of the target face image.

In step S303, a UV template map is acquired, and the UV template map includes a pre-labeled face key point.

The UV template map may be a two-dimensional map acquired by summarizing a large number of UV coordinate maps. A face key point is labeled in the UV template map which is suitable for the detection of key points of most faces.

Figure 7:
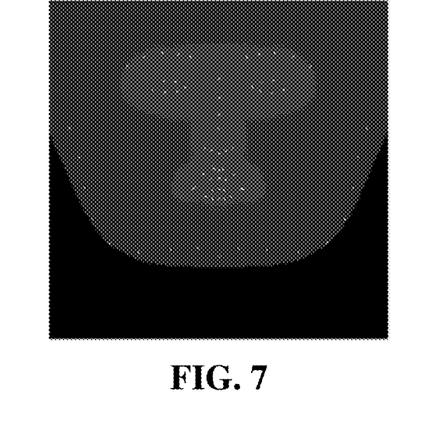
FIG. 7 is a schematic diagram of a UV template image according to an embodiment of the present disclosure.

FIG. 7 is a schematic diagram of a UV template map according to an embodiment of the present disclosure. The UV template map is pre-labeled with a face key point. For example, face key points such as eyes, nose, mouth, and face contours are labeled on the UV template map.

In step S304, a pixel point corresponding to the face key point is determined in the UV coordinate map so as to detect three-dimensional coordinates of the face key point.

In an embodiment of the present disclosure, the resolution of the UV coordinate map is the same as that of the UV template map, and the pixels thereof are in a one-to-one correspondence. A pixel point corresponding to the face key point pre-labeled on the UV template may be determined in the UV coordinate map in order to detect the three-dimensional coordinates of the face key point, thereby improving the detection efficiency of the face key point.

For example, in the UV template map, a classification mark may be added to the pre-labeled face key point based on different service requirements to meet the different service needs of users. For example, key points of the eyes are marked as A, key points of the nose are classified as B, key points of the mouth are marked as C, and the like. When the user needs to add special effects to the eyes in the live video, face key points marked as A on the UV template map are valid, then pixel points corresponding to the face key points marked as A may be determined in the UV coordinate map, and then acquire the three-dimensional coordinates associated with the pixel points to realize the detection of the face key points, such that special effects may be performed based on the three-dimensional coordinates of the face key points.

In the embodiment of the present disclosure, the UV coordinate map of the target face image is generated by inputting the target face image into the pre-trained face detection model, the UV template map including the pre-labeled face key point is acquired, and the pixel point corresponding to the face key point is determined in the UV coordinate map to detect three-dimensional coordinates of the face key point. The face detection model in the embodiment of the present disclosure does not need to manually label the training face image and the training UV coordinate map, thereby avoiding the situations where manual estimation and labeling need to be performed on the training data in the related art and thus result in inaccurate training data and inaccurate face key point coordinates output by the CNN. The embodiments of the present disclosure improve the performance of the face detection model, and are able to acquire accurate face key points.

Each pixel point in the UV coordinate map includes three-dimensional coordinates. Three-dimensional coordinates of a key point may be detected, such that the detected face key point has depth information, and the application scenarios of the key point is enriched.

Figure 8:
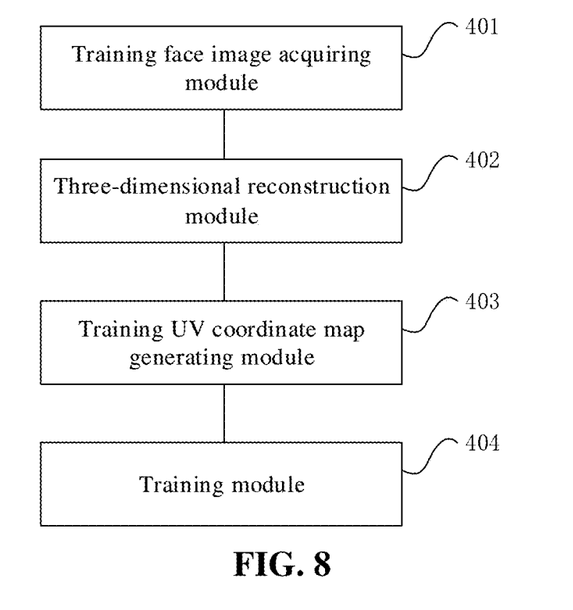
FIG. 8 is a structural block diagram of an apparatus for raining a face detection model according to an embodiment of the present disclosure.

FIG. 8 is a structural block diagram of an apparatus for training a face detection model according to an embodiment of the present disclosure. As shown in FIG. 8, the apparatus includes a training face image acquiring module 401, a three-dimensional reconstruction module 402, a training UV coordinate map generating module 403 and a training module 404.

The training face image acquiring module 401 is configured to acquire a training face image.

The three-dimensional reconstruction module 402 is configured to acquire a training three-dimensional face model by performing three-dimensional reconstruction on the training face image based on a preset three-dimensional face model.

The training UV coordinate map generating module 403 is configured to generate a training UV coordinate map including three-dimensional coordinates of the training three-dimensional face model based on the training three-dimensional face model.

The training module 404 is configured to acquire a face detection model by training a semantic segmentation network by using the training face image and the training UV coordinate map, wherein the face detection model s configured to generate a UV coordinate map including three-dimensional coordinates.

In an embodiment, the three-dimensional reconstruction module 402 includes a three-dimensional face model selecting sub-module, a principal component analyzing sub-module and a three-dimensional reconstruction sub-module.

The three-dimensional face model selecting sub-module is configured to select M three-dimensional face models.

The principal component analyzing sub-module is configured to acquire a principal component matrix and an eigenvalue matrix by performing principal component analysis (PCA) on the M three-dimensional face models.

The three-dimensional reconstruction sub-module is configured to, for each training face image, acquire the training three-dimensional face model by performing three-dimensional reconstruction on each training face image using the principal component matrix and an eigenvalue matrix corresponding to each training face image.

In an embodiment, the three-dimensional reconstruction module 402 further includes a three-dimensional face model preprocessing sub-module and a three-dimensional face model aligning sub-module.

The three-dimensional face model preprocessing sub-module is configured to preprocess the selected three-dimensional face models.

The three-dimensional face model aligning sub-module is configured to acquire aligned three-dimensional face models by aligning preprocessed three-dimensional face models using an optical flow method.

The preprocessing includes at least one of: smoothing, hole-filling and coordinate correction.

In an embodiment, the three-dimensional reconstruction module includes an initial parameter setting unit, an initial three-dimensional face model constructing unit, an initial three-dimensional face model projecting unit, a difference value calculating unit, an optimizing unit and a training three-dimensional face model generating unit.

The initial parameter setting unit is configured to set an initial eigenvalue matrix and an initial projection parameter matrix.

The initial three-dimensional face model constructing unit is configured to construct an initial three-dimensional face model by using the initial eigenvalue matrix and the principal component matrix.

The initial three-dimensional face model projecting unit is configured to acquire a projected face image of the initial three-dimensional face model in a two-dimensional space based on the initial projection parameter matrix.

The difference value calculating unit is configured to calculate a difference value between the projected face image and the training face image.

The optimizing unit is configured to iteratively optimize the initial eigenvalue matrix and the initial projection parameter matrix by using a stochastic gradient descent method based on the difference value, and when the difference value converges, acquire the eigenvalue matrix and the projection parameter matrix and take the eigenvalue matrix and the projection parameter matrix as a target eigenvalue matrix and a target projection parameter matrix, and take the target eigenvalue matrix as the eigenvalue matrix corresponding to the training face image.

The training three-dimensional face model generating unit is configured to generate the training three-dimensional face model by using the target eigenvalue matrix and the principal component matrix.

In an embodiment, the optimizing unit includes a feature point selecting sub-unit, a difference value calculating sub-unit, a first iterative optimization sub-unit and a second iterative optimization sub-unit.

The feature point selecting sub-unit is configured to, for first N rounds of iterative optimization, randomly select K feature points from the training face image and the projected face image. The feature points may be key pixel points describing the contours of eyebrows, eyes, a nose, a mouth and ears of a face, or may be pixel points in the contours of eyes, the mouth or the facial figure.

The difference value calculating sub-unit is configured to calculate a difference value between the projected face image and the training face image based on the K feature points.

The first iterative optimization sub-unit is configured to iteratively optimize part of the eigenvalues in the initial eigenvalue matrix and the initial projection parameter matrix using the stochastic gradient descent method based on the difference value.

The second iterative optimization sub-unit is configured to, after the N rounds of iterative optimization, optimize all the eigenvalues in the eigenvalue matrix after the N rounds of iterations and the projection parameter matrix after the N rounds of iterations using the stochastic gradient descent method, and when the difference value converges, acquire the eigenvalue matrix and the projection parameter matrix and take the eigenvalue matrix and the projection parameter matrix as the target eigenvalue matrix and the target projection parameter matrix.

In an embodiment, the training UV coordinate map generating module 403 includes a vertex acquiring sub-module, a projecting sub-module and a training UV coordinate map generating sub-module.

The vertex acquiring sub-module is configured to acquire a plurality of vertices of the training three-dimensional face model, and each of the vertices has three-dimensional coordinates.

The projecting sub-module is configured to project the plurality of vertices onto the preset spherical surface and acquire a plurality of projection points corresponding to the plurality of vertices on a preset spherical surface.

The training UV coordinate map generating sub-module is configured to unfold the spherical surface containing the plurality of projection points so as to generate a training UV coordinate map containing the plurality of projection points, wherein each projection point in the training UV coordinate map is associated with three-dimensional coordinates of a corresponding vertex.

In an embodiment, the training module 404 includes a training face image extracting sub-module, a predicted UV coordinate map extracting sub-module, a loss rate calculating sub-module, a gradient calculating sub-module, an iteration condition judging sub-module, a face detection model determining sub-module and a network parameter adjusting sub-module.

The training face image extracting sub-module is configured to extract the training face image.

The predicted UV coordinate map extracting sub-module is configured to input the training face image into a semantic segmentation network so as to extract a predicted UV coordinate map.

The loss rate calculating sub-module is configured to calculate a loss rate of the predicted UV coordinate map by using a preset loss function and the training UV coordinate map.

The gradient calculating sub-module is configured to calculate a gradient using the loss rate.

The iteration condition judging sub-module is configured to judge whether the gradient satisfies a preset iteration condition.

The face detection model determining sub-module is configured to determine the semantic segmentation network as a face detection model.

The network parameter adjusting sub-module is configured to perform gradient descent on a network parameter of the semantic segmentation network using the gradient and a preset learning rate, and return to the step of extracting the training face image.

In an embodiment, the loss rate calculating sub-module includes a training UV coordinate map unit and a loss rate calculating unit.

The training UV coordinate map unit is configured to acquire a training UV coordinate map corresponding to the training face image.

The loss rate calculating unit is configured to calculate the loss rate of the predicted UV coordinate map by using the training UV coordinate map, the predicted UV coordinate map, the preset loss function and a preset loss weight, wherein the preset loss weight is a preset loss weight of a feature point in the training UV coordinate map. The feature points here may be key pixel points describing the contours of eyebrows, eyes, a nose, a mouth and ears of a face, or may be pixel points in the contours of eyes, the mouth or the facial figure.

The apparatus for training a face detection model according to the embodiment of the present disclosure may perform the method for training a face detection model according to any embodiment of the present disclosure.

Figure 9:
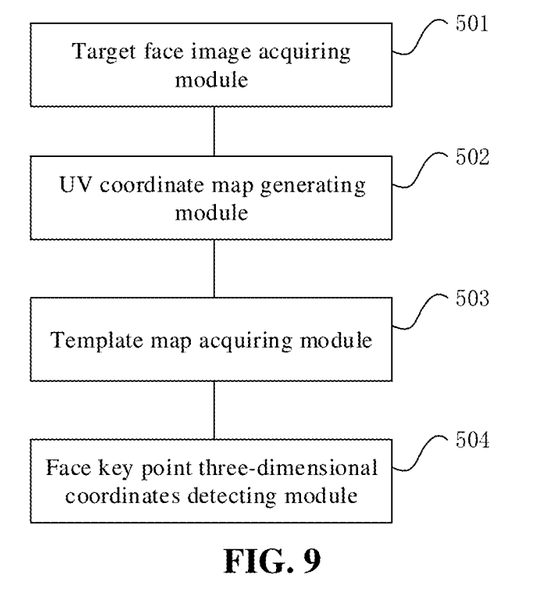
FIG. 9 is a structural block diagram of an apparatus for detecting a face key point according to an embodiment of the present disclosure.

FIG. 9 is a structural block diagram of an apparatus for detecting a face key point according to an embodiment of the present disclosure. As shown in FIG. 9, the apparatus includes a target face image acquiring module 501, a UV coordinate map generating module 502, a template image acquiring module 503 and a face key point three-dimensional coordinates detecting module 504.

The target face image acquiring module 501 is configured to acquire a target face image.

The UV coordinate map generating module 502 is configured to input the target face image into a pre-trained face detection model so as to generate a UV coordinate map of the target face image, wherein the UV coordinate map includes a plurality of pixel points, and each pixel point of the UV coordinate map includes three-dimensional coordinates.

The template image acquiring module 503 is configured to acquire a UV template image including a pre-labeled face key point.

The face key point three-dimensional coordinates detecting module 504 is configured to determine pixel points corresponding to the face key points in the UV coordinate map so as to detect three-dimensional coordinates of the face key points.

The apparatus for detecting a face key point according to the embodiment of the present disclosure may perform the method for detecting a face key point according to any embodiment of the present disclosure, has the functional modules for performing the corresponding methods and can produce the corresponding beneficial effects.

Figure 10:
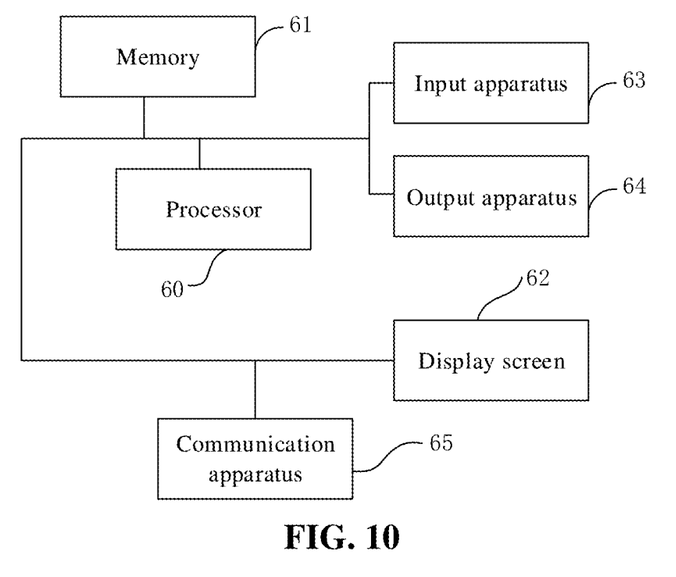
FIG. 10 is a structural block diagram of a device according to an embodiment of the present disclosure.

FIG. 10 shows a schematic structural block diagram of a device according to an embodiment of the present disclosure. As shown in FIG. 10, the device includes: a processor 60, a memory 61, a display screen 62 with a touch function, an input apparatus 63, an output apparatus 64, and a communication apparatus 65. The number of the processors 60 in the device may be at least one. In FIG. 10, one processor 60 is taken as an example. The number of the memory 61 in the device may be at least one. In FIG. 10, one memory 61 is taken as an example. The processor 60, the memory 61, the display screen 62, the input apparatus 63, the output apparatus 64, and the communication apparatus 65 of the device may be connected by a bus or other means. The connection is realized by a bus in FIG. 10 as an example.

As a computer-readable storage medium, the memory 61 is configured to store software programs, computer-executable programs and modules, such as the program instructions/modules corresponding to the method for training a face detection model according to any embodiment of the present disclosure (for example, the training face image acquiring module 401, the three-dimensional reconstruction module 402, the training UV coordinate map generating module 403 and the training module 404 of the above apparatus for training a face detection model) or the program instructions/modules corresponding to the method for detecting a face key point according to any embodiment of the present disclosure (for example, the target face image acquiring module 501, the UV coordinate map generating module 502, the template image acquiring module 503 and the face key point three-dimensional coordinates detecting module 504 of the above apparatus for detecting a face key point). The memory 61 may mainly include a program storage region and a data storage area. The program storage region may store an operation apparatus program, and an application program required by at least one function. The data storage region may store data created based on the use of the device, and the like. In addition, the memory 61 may include a high-speed random-access memory, and may further include a non-volatile memory, such as at least one magnetic disk storage device, a flash memory device, or other non-volatile solid-state storage devices. In some examples, the memory 61 may further include a memory remotely provided with respect to the processor 60. These remote memories may be connected to the device 10 via a network. Examples of the networks include, but are not limited to, the Internet, an intranet, a local area network, a mobile communication network, and combinations thereof.

The display screen 62 is a display screen 62 with a touch function, and may be a capacitive screen, an electromagnetic screen or an infrared screen. In general, the display screen 62 is configured to display data based on instructions of the processor 60, and is further configured to receive touch operations on the display screen 62 and send corresponding signals to the processor 60 or other devices. In an embodiment, in the case that the display screen 62 is the infrared screen, the display screen 62 further includes an infrared touch frame. The infrared touch frame is disposed around the display 42, and is configured to receive an infrared signal and send the infrared signal to the processor 50 or other devices.

The communication apparatus 65 is configured to establish a communication connection with other devices, and may be at least one of a wired communication apparatus and a wireless communication apparatus.

The input apparatus 63 is configured to receive input digital or character information, and generate key signal input related to user settings and function control of the device, and is further configured as a camera for acquiring images and a sound pickup device for acquiring audio data. The output apparatus 64 may include an audio device such as a speaker. It should be noted that the composition of the input apparatus 63 and the output apparatus 64 may be set based on actual conditions.

The processor 60 executes various functional applications and data processing of the device by running software programs, instructions, and modules stored in the memory 61, so as to realize the above task processing method based on the neural network.

According to the sixth aspect, an embodiment of the present disclosure provides a computer-readable storage medium. The computer-readable storage medium stores a computer program therein, wherein when the program is executed by a processor, at least one of the methods for training a face detection model and the method for detecting a face key point according to any of the embodiments of the present disclosure is realized.

An embodiment of the present disclosure further provides a computer-readable storage medium. An instruction in the storage medium, which being executed by the processor of the device, enables the device to perform the audio detection method according to the above method embodiment.

It should be noted that, for the apparatus, device, and storage medium embodiments, since they are basically similar to the method embodiments, the description is relatively simple. For related parts, please refer to the part of the description of the method embodiments.

Through the above description to the embodiments, it can be clearly understood by those skilled in the art that, the present application may be implemented by hardware, or by software and necessary common hardware, and of course may be implemented by hardware. Based on such understandings, the technical solutions of the present application or the part thereof contributing to the prior art may be substantially reflected in the form of a software product. The computer software product is stored in a computer readable storage medium, and includes several instructions to cause a computer device (which may be a robot, a personal computer, a server or a network device) to perform the audio detection method according to any embodiment of the present disclosure, the storage medium including a floppy disk of a computer, a read-only memory (ROM), a random-access memory (RAM), a flash, a hard disk, an optical disk, or the like.

It is worth noting that, in the above-mentioned audio detection apparatus, each unit and module included therein are only divided according to functional logic, but not limited to the above division, as long as the corresponding functions can be realized. In addition, the specific name of each functional unit is only for the convenience of distinguishing each other, and is not used to limit the protection scope of the present application.

It should be noted that each part in the present application may be implemented in hardware, software, firmware, or any combination thereof. In the above embodiments, a plurality of steps or methods may be implemented with software or firmware that are stored in the memory and executed by a suitable instruction execution system. For example, if implemented with hardware, as in another embodiment, they may be implemented using any one or a combination of the following techniques well known in the art: a discrete logic circuit having a logic gate circuit having logic gates for implementing logic functions of data signals, an application-specific integrated circuit with a suitable combinational logic gate circuit, a programmable gate array (PGA), a field programmable gate array (FPGA), and the like.

In the description of the present specification, the description of referring terms such as "an embodiment", "some embodiments", "an example", "a specific example" and "some examples" integrate particular features, structures, materials or characteristics described in combination of the embodiments or examples and included in at least one embodiment or example of the present application. In the description, schematic description of the above terms does not necessarily refer to the same embodiment or example. Furthermore, the described particular features, structures, materials or characteristics can be integrated with any one or more embodiments or examples in a proper manner.

What is claimed is:

1. A method for training a face detection model, comprising: acquiring a training face image;
performing three-dimensional reconstruction on the training face image based on a preset three-dimensional face model, and acquiring a training three-dimensional face model;
generating a training UV coordinate map comprising three-dimensional coordinates of the training three-dimensional face model based on the training three-dimensional face model, wherein U is a horizontal coordinate and V is a vertical coordinate; and
extracting the training face image;
inputting the training face image into a semantic segmentation network to extract a predicted UV coordinate map;
calculating a loss rate of the predicted UV coordinate map by using a preset loss function and the training UV coordinate map;
calculating a gradient by using the loss rate;
judging whether the gradient satisfies a preset iteration condition;
if yes, determining the semantic segmentation network as a face detection model;
performing gradient descent on a network parameter of the semantic segmentation network by using the gradient and a preset learning rate;
if no, returning to the step of extracting the training face image;
wherein performing the three-dimensional reconstruction on the training face image based on the preset three-dimensional face model, and acquiring the training three-dimensional face model comprises:
selecting M three-dimensional face models;
performing principal component analysis on the M three-dimensional face models, and acquiring a principal component matrix and an eigenvalue matrix; and
performing three-dimensional reconstruction on each training face image by using the principal component matrix and the eigenvalue matrix, and acquiring the training three-dimensional face model.

2. The method according to claim 1, before performing principal component analysis on the M three-dimensional face models, and acquiring a principal component matrix, further comprising:
preprocessing selected three-dimensional face models; and
aligning preprocessed three-dimensional face models by using an optical flow method, and acquiring aligned three-dimensional face models,
wherein the preprocessing comprises at least one of: smoothing, hole-filling and coordinate correction.

3. A method for detecting a face key point, comprising: acquiring a target face image;
inputting the target face image into a pre-trained face detection model to generate a UV coordinate map of the target face image, wherein each pixel point of the UV coordinate map comprises three-dimensional coordinates;
acquiring a UV template image comprising a pre-labeled face key point; and
determining a pixel point corresponding to the face key point in the UV coordinate map to detect three-dimensional coordinates of the face key point;
wherein the pre-trained face detection model is trained by the method for training the face detection model according to claim 2.

4. A device comprising:
at least one processor; and
a storage apparatus for storing at least one program, wherein when the at least one program is executed by the at least one processor, the at least one processor executes the method for training a face detection model according to claim 2.

5. The method according to claim 1, wherein performing three-dimensional reconstruction on each training face image by using the principal component matrix and the eigenvalue matrix, and acquiring the training three-dimensional face model comprises:
setting an initial eigenvalue matrix and an initial projection parameter matrix;
constructing an initial three-dimensional face model by using the initial eigenvalue matrix and the principal component matrix;
acquiring a projected face image of the initial three-dimensional face model in a two-dimensional space based on the initial projection parameter matrix;
calculating a difference value between the projected face image and the training face image;
iteratively optimizing the initial eigenvalue matrix and the initial projection parameter matrix by using a stochastic gradient descent method based on the difference value, acquiring the eigenvalue matrix and the projection parameter matrix, when the difference value converges and taking the eigenvalue matrix and the projection parameter matrix as a target eigenvalue matrix and a target projection parameter matrix; and
generating the training three-dimensional face model by using the target eigenvalue matrix and the principal component matrix.

6. The method according to claim 5, wherein iteratively optimizing the initial eigenvalue matrix and the initial projection parameter matrix by using a stochastic gradient descent method based on the difference value, acquiring the eigenvalue matrix and the projection parameter matrix, when the difference value converges, and taking the eigenvalue matrix and the projection parameter matrix as a target eigenvalue matrix and a target projection parameter matrix comprises:

randomly selecting K feature points from the training face image and the projected face image, for first N rounds of iterative optimization;

calculating a difference value between the projected face image and the training face image based on the K feature points;

iteratively optimizing part of eigenvalues in the initial eigenvalue matrix and the initial projection parameter matrix using the stochastic gradient descent method based on the difference value; and after the first N rounds of iterative optimization, optimizing all the eigenvalues and the initial projection parameter matrix by using the stochastic gradient descent method, acquiring the eigenvalue matrix and the projection parameter matrix, when the difference value converges, and taking the eigenvalue matrix and the projection parameter matrix as the target eigenvalue matrix and the target projection parameter matrix.

7. A method for detecting a face key point, comprising:
acquiring a target face image; inputting the target face image into a pre-trained face detection model to generate a UV coordinate map of the target face image, wherein each pixel point of the UV coordinate map comprises three-dimensional coordinates;

acquiring a UV template image comprising a pre-labeled face key point; and determining a pixel point corresponding to the face key point in the UV coordinate map to detect three-dimensional coordinates of the face key point;

wherein the pre-trained face detection model is trained by the method for training the face detection model according to claim 6.

8. A method for detecting a face key point, comprising:
acquiring a target face image;
inputting the target face image into a pre-trained face detection model to generate a UV coordinate map of the target face image, wherein each pixel point of the UV coordinate map comprises three-dimensional coordinates;

acquiring a UV template image comprising a pre-labeled face key point; and determining a pixel point corresponding to the face key point in the UV coordinate map to detect three-dimensional coordinates of the face key point;

wherein the pre-trained face detection model is trained by the method for training the face detection model according to claim 5.

9. The method according to claim 1, wherein generating the training UV coordinate map comprising the three-dimensional coordinates of the training three-dimensional face model based on the training three-dimensional face model comprises:

acquiring a vertex of the training three-dimensional face model, vertex having three-dimensional coordinates;

projecting the vertex onto a preset spherical surface and acquiring a projection point corresponding to the vertex on the preset spherical surface; and unfolding the preset spherical surface comprising the projection point to generate a training UV coordinate map comprising the projection point, wherein each projection point in the training UV coordinate map is associated with three-dimensional coordinates of the vertex.

10. A method for detecting a face key point, comprising:
acquiring a target face image;
inputting the target face image into a pre-trained face detection model to generate a UV coordinate map of the target face image, wherein each pixel point of the UV coordinate map comprises three-dimensional coordinates;

acquiring a UV template image comprising a pre-labeled face key point; and determining a pixel point corresponding to the face key point in the UV coordinate map to detect three-dimensional coordinates of the face key point;

wherein the pre-trained face detection model is trained by the method for training the face detection model according to claim 9.

11. The method according to claim 1, wherein calculating the loss rate of the predicted UV coordinate map by using the preset loss function and the training UV coordinate map comprises:

acquiring a training UV coordinate map corresponding to the training face image; and calculating the loss rate by using the training UV coordinate map, the predicted UV coordinate map, the preset loss function and a preset loss weight, wherein the preset loss weight is a weight of a preset feature point.

12. A method for detecting a face key point, comprising:
acquiring a target face image; inputting the target face image into a pre-trained face detection model to generate a UV coordinate map of the target face image, wherein each pixel point of the UV coordinate map comprises three-dimensional coordinates;

acquiring a UV template image comprising a pre-labeled face key point; and determining a pixel point corresponding to the face key point in the UV coordinate map to detect three-dimensional coordinates of the face key point;

wherein the pre-trained face detection model is trained by the method for training the face detection model according to claim 1.

13. A device comprising:
at least one processor; and
a storage apparatus for storing at least one program, wherein when the at least one program is executed by the at least one processor, the at least one processor executes the method for detecting a face key point according to claim 12.

14. A non-transitory computer-readable storage medium storing a computer program therein, wherein when the program is executed by a processor, executes the method for detecting a face key point according to claim 12.

15. An apparatus for detecting a face key point, comprising:

a target face image acquiring module configured to acquire a target face image;

a UV coordinate map generating module configured to input the target face image into a pre-trained face detection model to generate a UV coordinate map of the target face image, wherein each pixel point of the UV coordinate map comprises three-dimensional coordinates;

a template image acquiring module configured to acquire a UV template image comprising a pre-labeled face key point; and a face key point three-dimensional coordinates detecting module configured to determine a pixel point corresponding to the face key point in the UV coordinate map to detect three-dimensional coordinates of the face key point;

wherein the pre-trained face detection model is trained by the method for training the face detection model according to claim 1.

16. A device comprising:
at least one processor; and
a storage apparatus for storing at least one program,
wherein when the at least one program is executed by the at least one processor, the at least one processor is enabled to realize the method for training a face detection model according to claim 1.

17. A non-transitory computer-readable storage medium storing a computer program therein, wherein when the program is executed by a processor, executes the method for training a face detection model according to claim 1.

18. A method for detecting a face key point, comprising:
acquiring a target face image;
inputting the target face image into a pre-trained face detection model to generate a UV coordinate map of the target face image, wherein each pixel point of the UV coordinate map comprises three-dimensional coordinates;
acquiring a UV template image comprising a pre-labeled face key point; and determining a pixel point corresponding to the face key point in the UV coordinate map to detect three-dimensional coordinates of the face key point;
wherein the pre-trained face detection model is trained by the method for training the face detection model according to claim 1.

19. An apparatus for training a face detection model, comprising:
a training face image acquiring module configured to acquire a training face image;
a three-dimensional reconstruction module configured to perform three-dimensional reconstruction on the training face image based on a preset three-dimensional face model and acquire a training three-dimensional face model;
a training UV coordinate map generating module configured to generate a training UV coordinate map comprising three-dimensionalcoordinates of the training three-dimensional face model based on the training three-dimensional face model, wherein U is a horizontal coordinate and V is a vertical coordinate; and
a training module configured to train a semantic segmentation network by using the training face image and the training UV coordinate map and acquire a face detection model, wherein the face detection model is configured to generate a UV coordinate map comprising three-dimensional coordinates;

wherein the training module comprises:
a training face image extracting sub-module configured to extract the training face image;
a predicted UV coordinate map extracting sub-module configured to input the training face image into a semantic segmentation network so as to extract a predicted UV coordinate map;
a loss rate calculating sub-module configured to calculate a loss rate of the predicted UV coordinate map by using a preset loss function and the training UV coordinate map;
a gradient calculating sub-module configured to calculate a gradient using the loss rate;
an iteration condition judging sub-module configured to judge whetherthe gradient satisfies a preset iteration condition;
a face detection model determining sub-module configured to determine the semantic segmentation network as a face detection model;
a network parameter adjusting sub-module configured to perform gradient descent on a network parameter of the semantic segmentation network using the gradient and a preset learning rate, and return to the step of extracting the training face image; and wherein the three-dimensional reconstruction module comprises:
a three-dimensional face model selecting sub-module configured to select M three-dimensional face models;
a principal component analyzing sub-module is configured to acquire a principal component matrix and an eigenvalue matrix by performing principal component analysis on the M three-dimensional face models; and
a three-dimensional reconstruction sub-module configured to, for each training face image, acquire the training three-dimensional face model by performing three-dimensional reconstruction on each training face image using the principal component matrix and the eigenvalue matrix.

* * * * *